United States Patent [19]

Reed et al.

[11] 4,051,856

[45] Oct. 4, 1977

[54] PNEUMATIC ROTARY CLASSIFIER

[75] Inventors: William B. Reed; Floyd W. Bigsby, both of Saskatoon, Canada

[73] Assignee: Western Roto Thresh Ltd., Saskatoon, Canada

[21] Appl. No.: 680,447

[22] Filed: Apr. 26, 1976

Related U.S. Application Data

[63] Continuation of Ser. No. 601,589, Aug. 4, 1975, abandoned, which is a continuation of Ser. No. 503,181, Sept. 4, 1974, abandoned, which is a continuation-in-part of Ser. No. 369,004, June 11, 1973, abandoned, which is a continuation of Ser. No. 222,084, Jan. 31, 1972, abandoned.

[30] Foreign Application Priority Data

Nov. 22, 1971 Canada .................................. 128236

[51] Int. Cl.² ............................................ A01F 12/18
[52] U.S. Cl. ............................................. 130/27 HF
[58] Field of Search .................. 130/24, 27 R, 27 HF

[56] References Cited

U.S. PATENT DOCUMENTS

| 1,884,114 | 10/1932 | Moroney | 130/24 |
| 1,917,536 | 7/1933 | McIntire | 130/24 |
| 2,612,742 | 10/1952 | Heth | 130/27 R |
| 3,391,523 | 7/1968 | McBain et al. | 130/27 R |
| 3,580,258 | 5/1971 | Stroburg | 130/27 R |

FOREIGN PATENT DOCUMENTS

| 557,810 | 5/1958 | Canada | 130/27 R |
| 802,635 | 12/1968 | Canada | 130/27 R |

Primary Examiner—Russell R. Kinsey
Attorney, Agent, or Firm—Stevens, Davis, Miller & Mosher

[57] ABSTRACT

A pneumatic concave grain separator is provided to remove as much as possible of the chaff and straw from the grain as the mixture is forced through the concave and grate below the threshing cylinder of a combine. Fan means draws air from below and through the concave and air velocity and deflector arrangements are provided to permit removal of the majority of chaff and straw with a negligible amount of grain kernels.

3 Claims, 5 Drawing Figures

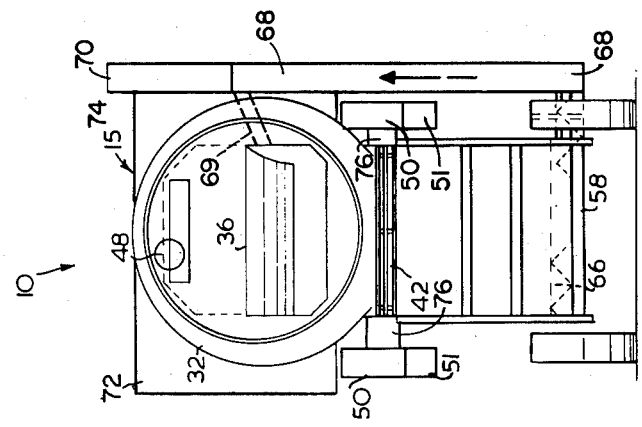
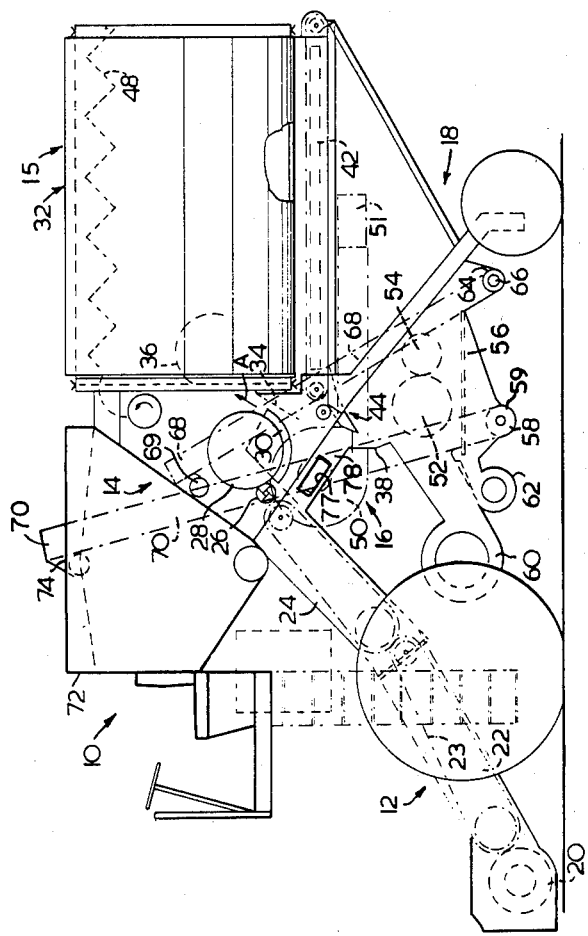

PNEUMATIC ROTARY CLASSIFIER

This is a Continuation of application Ser. No. 601,589 filed Aug. 4, 1975, now abandoned, which is a continuation of Ser. No. 503,181 filed Sept. 4, 1974 (now abandoned), which is a CIP of Ser. No. 369,004 filed June 11, 1973 (now abandoned), which is in turn a continuation of parent application Ser. No. 222,084, filed Jan. 31, 1972 (and now abandoned).

This invention relates to devices for separating grain from material other than grain and in particular to a rotary type of grain separator.

Conventional combines separate threshed grain from straw by a device commonly known as a "straw walker." There are many variations of straw walkers but all variations work on the principle of shaking a slotted deck by a motion that tends to move the straw rearwardly of the deck. By such action, the grain and chaff shakes to the bottom and drops through the slots to subsequently be conveyed to a cleaner where the grain is then separated from the chaff. One of the main deficiencies of combines using straw walkers, is that the deck should be used in a horizontal orientation and when the deck is tilted sideways such as when a combine is operating on a side hill or similar contour, it will tend to concentrate the straw on the low side of the deck and thereby impede the separation. It will also be appreciated that forward or backward tilting of the deck will have the same effect and it will affect the rate of speed at which the material is "walked" over the walker deck.

The present invention is adapted for use on combines using a basic method of rotary separation such as that disclosed in Canadian Pat. No. 557,810 which issued on May the 27th, 1958, an improvement thereof being disclosed in Canadian Pat. No. 802,635 of Dec. the 31st, 1968 The method of rotary separation dispenses with the conventional straw-walker deck and employs a drum rotating about a horizontal axis. A grain and straw mixture picked up by the combine is passed through the nip of a rotary cylinder and concave and discharged therefrom into the interior of the drum where it is rotated. The material is forced against the inner facing of the drum by centrifugal action and the grain passes through openings in the drum and is subsequently conveyed to a cleaner.

The present invention adds a two-stage cleaning operation to the rotary separation method. Reverting again to the conventional combine harvester, all the grain and chaff mixture is deposited on a top cleaner sieve and is again separated by shaking action assisted by a forced air flow to fluidize the material on the sieve and prevent chaff from falling through the sieve. Here again, if the sieves are overloaded, proper separation is not achieved and a portion of the grain is lost out back of the machine along with the chaff. In the two-stage cleaning method of the present invention, the first stage is in effect an air classification system in which a portion of which the light debris or unwanted material other than grain is separated from the grain. This is effected by dropping the grain into a throat or plenum where a counter flow or air exists and with the material in the throat in a highly fluidized form permits separation of grain from the chaff. The counter flow air is provided by two aspirator suction fans which exhaust the air-chaff mixture to the rear of the cleaner and below the rotary straw and grain separating drum.

Depending upon the type of crop being harvested, the air classifier removes the major percentage of the chaff before it reaches the cleaner. It will be appreciated then that the load on the cleaner is drastically reduced since a major portion of the chaff never reaches it.

According to one aspect of the present invention, a cleaning and classifying assembly for use with a rotary combine having a swath pick-up assembly including means for conveying a swath to a rotary threshing assembly and a rotary straw deck positioned adjacent the threshing assembly, the cleaning and classifying assembly being mounted adjacent said rotary deck and rotary thresher and including a throat for dropping a grain mixture by gravity into said assembly; a fan means for providing a counter flow of air in said throat; means in the lower end of said assembly for cleaning chaff from the grain dropped by gravities through said throat, aspirator suction fans for exhausting the air-chaff mixture removed from said grain, means for passing the cleaned grain from the assembly to a hopper and means for transferring uncleaned grain back to said rotary thresher.

The invention will be described by way of example in the accompanying drawings in which:

FIG. 1 is a schematic elevation view of a harvester combine utilizing the present invention;

FIG. 2 is a schematic and elevation of the device in FIG. 1; and

Figure 3:
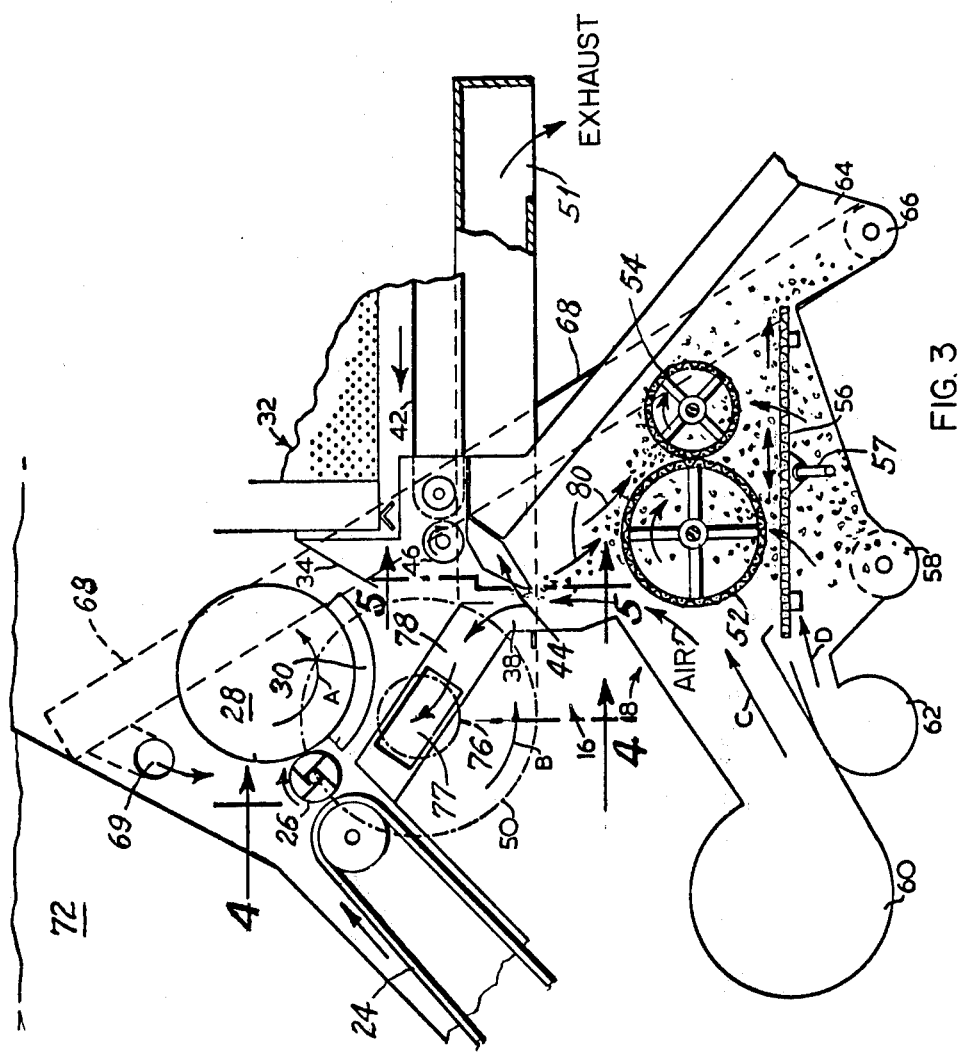
FIG. 3 is a enlarged view, in fragmentary form of the classification and cleaner sections of the harvesting unit.

Referring to FIG. 1, the combine 10 includes a table section 12 a threshing section 14 a separator section 15 a classifying section 16 and finally a cleaning section 18.

The table section 12 includes a table auger 20 which, when rotating, moves the material for threshing towards the centre of a primary feed 22 comprising a chain conveyer 23. Primary feed 22 in turn passes the material to be threshed to a secondary feed 24 to a combination spreader and feeder 26 which spreads the material across the face of a threshing cylinder 28 whereby the material is more evenly fed to the nip of the concave 30.

The velocity of the threshed material imparted to it by the threshing cylinder 28 deflects it upwardly in the direction of arrow A to enter the forward end of the rotary deck 32 through the guidance of a deflector plate 34 and eyebrow 36. Some grain which is immediately separated from the straw and chaff in the concave, drops downwardly into the throat 38 of the classifying section 16.

The rotary deck or drum 32 may be constructed as shown in Canadian Pat. Nos. 557,810 or 802,635 or preferably it may be of the type shown in copending application No. 280,244 filed Aug. 14, 1972, now U.S. Pat. No. 3,856,023 issued Dec. 24, 1974.

In either cases the threshed material is rotated with the drum 32 at a rotational speed sufficient to produce a centrifugal force which assists separation around the entire periphery of the drum. The grain and chaff are forced through openings in the drum surface thereafter to be deposited on a conveyor 42 which carriers the grain forwardly to a chute discharging in to throat 38 as shown in FIG. 3. It will also be noted from FIG. 3 that an auger 46 placed adjacent one terminal end of the conveyor 42 serves to distribute grain and material other than grain into the throat 38. The straw, weed stalks and the like remaining in the drum 32 are carried outwardly through the rear opening thereof. It will be noted from FIGS. 1 and 2 that a further auger 48 positioned adjacent to the inner periphery of the drum serves to strip any straw and the like that may be adhered to the inner surface of the drum and which fails to fall by gravity to the lower surface thereof.

It will be appreciated that at this point of the operation, the grain and chaff enter the throat 38 both from directly above as its exits from the perforations of the concave 30 and from the conveyor 42 and chute 44. As the grain enters the classification section 16, it is subjected to a counterflow of air provided by a fan 50 drawing in the direction of arrow B thereby to separate the grain and chaff as it falls downwardly in a fluidized form, the air velocity being so controlled that it will carry away the lighter chaff material and material other than grain through exhausts 51 (FIG. 1). The grain and remaining chaff or material other than grain fall downwardly through the throat 38 into the cleaning section 18 and onto a pair of rotating drum screens 52 and 54 positioned directly above a reciprocating adjustable sieve 56. Sieve 56 may be reciproacted by a suitable crank mechanism as indicated by reference numeral 57 in FIG. 3. Separation of coarse material other than grain and grain occurs over the rotating drum screens 52 and 54, with the major portion of the grain passing through the screen and the material other than grain passing over the rotating drum screens. An additional air flow in the direction of arrow C provided by fan 60 assists in the separation as the grain and chaff drops onto the rotating screened drums 52 and 54. The grain falls downwardly onto a reciprocating sieve 56, the heavier grain falling through the screen into the confines of a collecting auger 58, the lighter chaff and grain that is not yet separated from the chaff staying on top of the sieve. Any grain although minimal can pass or drop into the return auger 66.

Figure 4:
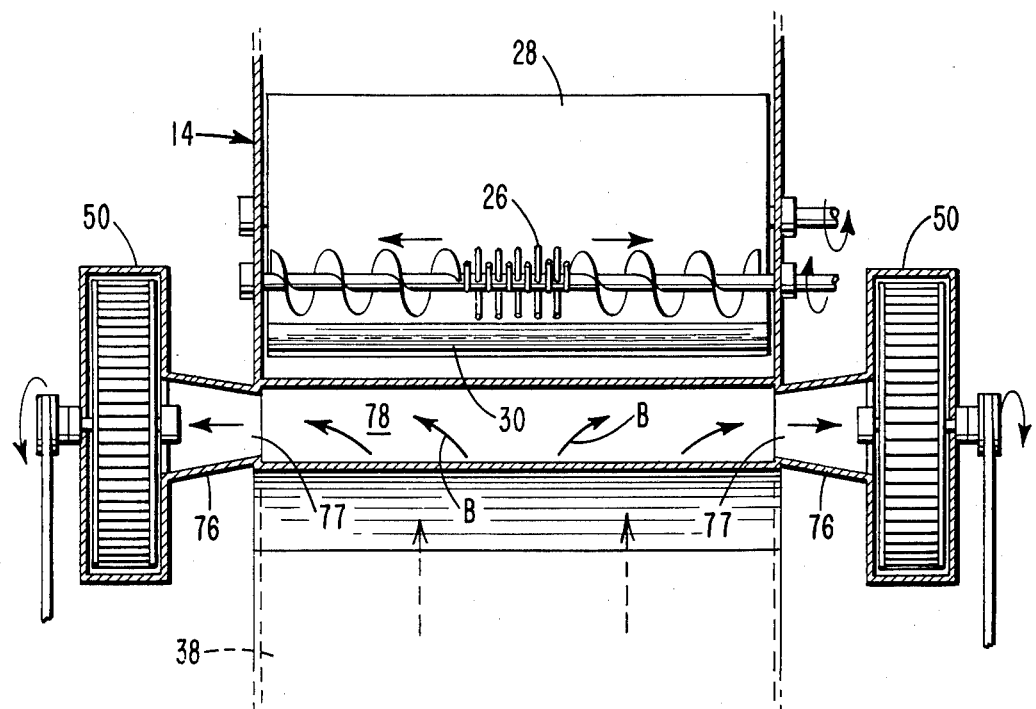
FIG. 4 is a sectional view along line 4—4 of FIG. 3.
Figure 5:
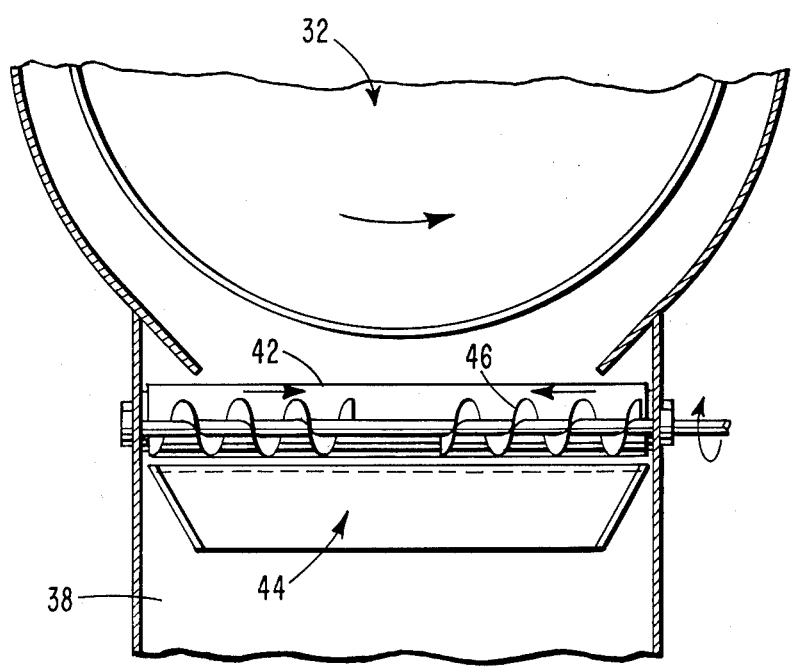
FIG. 5 is a sectional view along line 5—5 of FIG. 3.

Throughout this tumbling action on the screened drums 52 and 54 onto sieve 56, the grain and chaff is subjected to further fluidization by fan 60 and further fan 62 which serve to further classify the material by blowing in the direction of arrow D the unthreshed heads of grain with the chaff into a trough 64 having an auger 66 therein. It will be seen from FIG. 1 that auger 6 takes the uncleaned grain and passes it upwardly by means of an elevator 68 to a position above the rotary threshing cylinder 28 dropping it downwardly into the confines of that cylinder for recirculation. The cleaned grain in the trough of the auger 58 is carried upwardly in a further elevator 70 where it is deposited into a hopper 72 by way of a spout 74. As shown in FIG. 4, suction fans 50 communicate with throat 38 through short ducts 76 and through openings 77 into a duct 78 that communicates with throat 38.

We claim:

1. In a threshing machine having a rotary threshing cylinder, concave and an associated deck, a cleaning and classifying device for aspirating or pneumatically separating chaff from grain comprising
    a. panel means defining a vertically oriented throat disposed below said concave for passage of grain and chaff therethrough by gravity from said concave and deck;
    b. a pneumatic separation area in said throat comprising an airflow channel disposed adjacent to and communicating with said throat and first fan means at the end of the passage remote from the throat which, provides airflow from the throat into the fan;
    c. rotary screens and second fan means below said throat for further aspiration and mechanical separation of said chaff and grain;
    d. elevating means for transferring cleaned grain to a hopper on the threshing machine and;
    e. second elevating means for transferring uncleaned grain back to the rotary threshing cylinder for reclassification.

2. The device of claim 1 including a reciprocal sieve disposed below said screen drums and third fan means for providing aspiration for grain and any chaff passing downwardly through said drums and the reciprocal screen.

3. A device for use with combine harvesters to aspirate or pneumatically separate chaff from grain; said device comprising means defining a vertically oriented throat disposed below the concave of a threshing cylinder for passage of grain and chaff therethrough; and means providing a pneumatic separation area for separating material other than grain from said grain including an airflow channel disposed adjacent to and below said throat, a fan in communication with said channel to provide air flow therein and a vacuum in said throat; the walls of said means defining said throat and passage being arranged to direct and control passage of grain and chaff into the airflow provided by said fan means whereby grain and chaff falling downwardly through said throat by gravity are subjected to an air flow substantially opposite to the direction of fall for primary classification and cleaning; and a secondary classification in said device comprising a pair of rotary screened drums positioned below said throat; a deflector for directing falling grain and chaff onto said screened drums; and a second fan cooperating with said drums to blow chaff and material lighter than grain away from the drum surface while allowing the grain to pass downwardly therethrough.

* * * * *